July 20, 1965 L. D. MARTIN 3,195,220
SURFACE FINISHING APPARATUS AND PROCESS
Filed Dec. 30, 1963 2 Sheets-Sheet 1
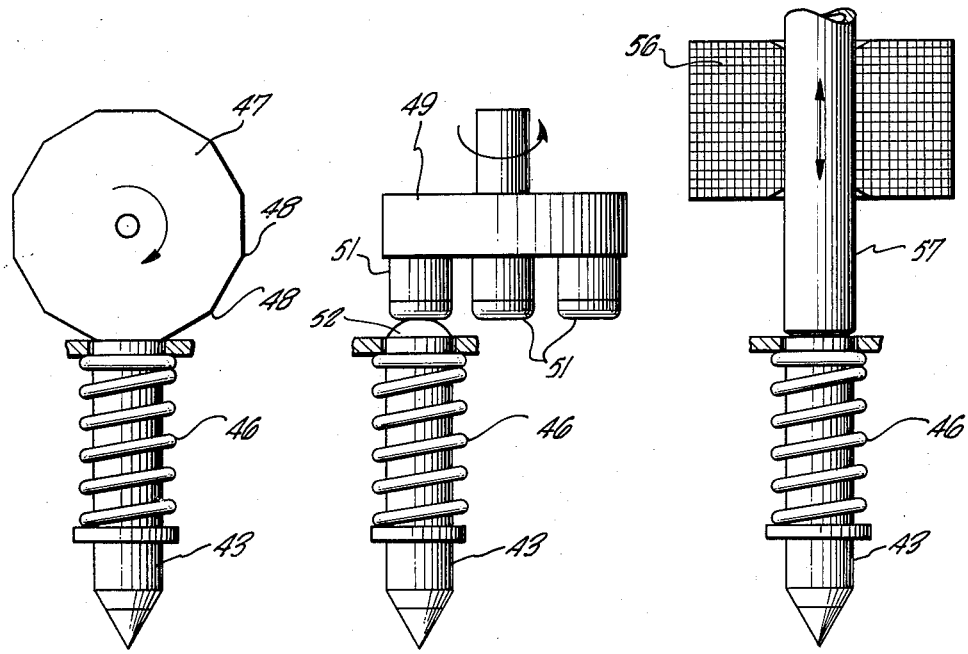
FIG. 4a   FIG. 4b   FIG. 4c
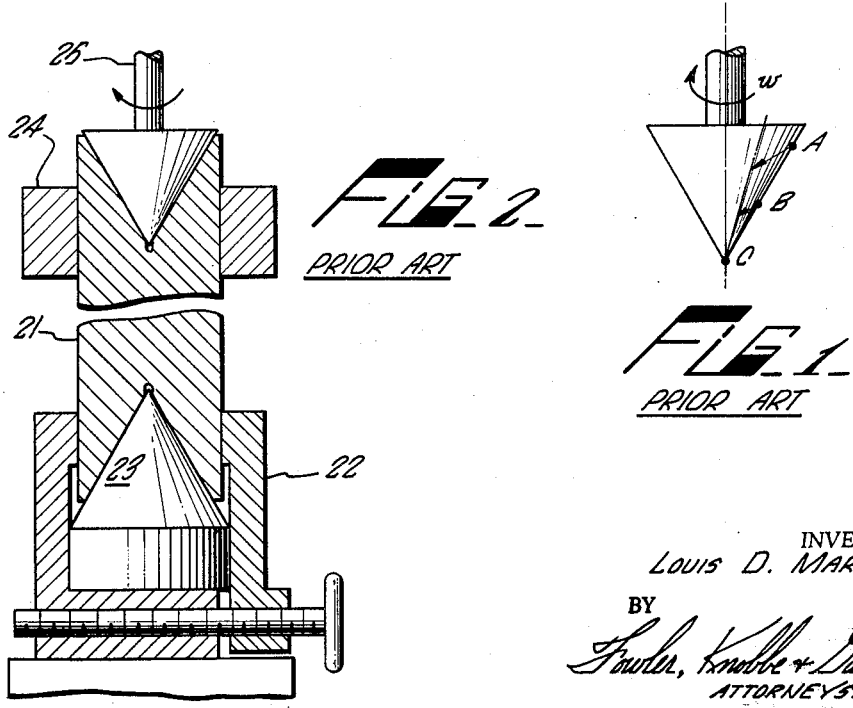
FIG. 2
PRIOR ART
FIG. 1
PRIOR ART
INVENTOR.
LOUIS D. MARTIN
BY
Fowler, Knobbe & Gambrell
ATTORNEYS

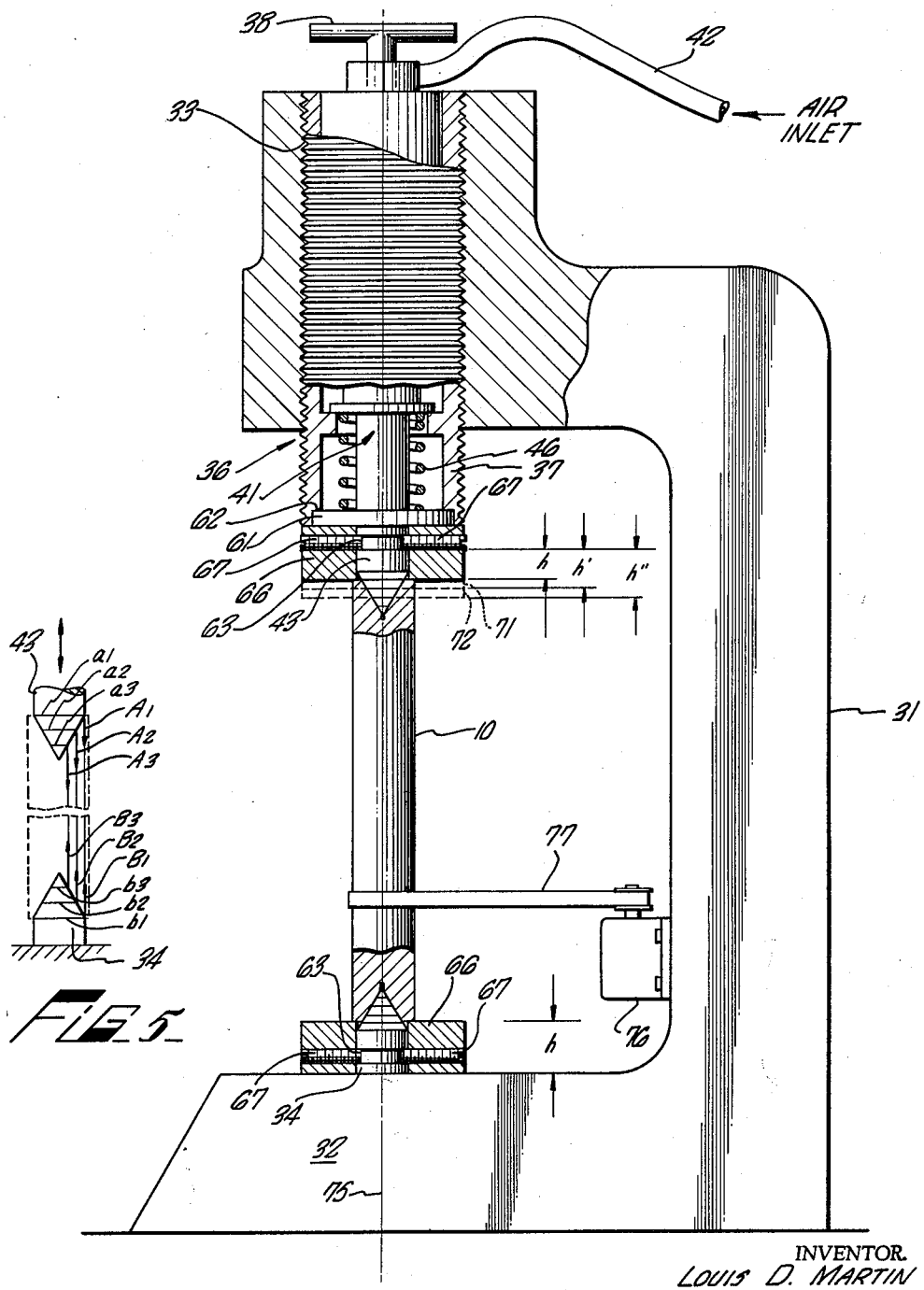

3,195,220
SURFACE FINISHING APPARATUS
AND PROCESS
Louis D. Martin, Fullerton, Calif., assignor of one-half to Karl H. Roehrs, Rolling Hills, Calif.
Filed Dec. 30, 1963, Ser. No. 334,360
6 Claims. (Cl. 29—90)

This invention relates to techniques for producing one or more accurately dimensioned surfaces or cavities in machine elements and work pieces and more particularly, to a process and apparatus for producing precision support surfaces for a work piece for further machining on a grinding machine or the like.

In the usual case, when gear teeth, a cam or some such element is to be cut on a work piece by an engine lathe, the center supports are merely drilled in the opposite ends of the work piece. Even when some refinement of this rough means is necessary to permit a more accurately finished product to be fabricated, it is usually limited to center-grinding, honing or lapping the center to smooth out the drill bit asperities.

In some applications, however, the finished product must be of such a high quality that sophisticated means are utilized to form the precision support centers so that precision machining can produce the needed excellence of the end product.

In the average case, the centers formed in a machine element can suffer from a variety of deficiencies without materially compromising the quality of the finished product. But this is not so when the end product is a precision part. Some common defects are: misaligned centers, improper or non-uniform angles of the sides of the center support aperture, eccentric centers, out-of-roundness centers and poor support surface finishes. These defects, singly or in combination, degrade the attainable quality of the finished work piece. To suggest only a few effects of these deficiencies emphasizes the importance of true and accurate centers. Out-of-roundness will transfer to the work piece as it is ground on such centers and produce out-of-round machine elements; misaligned centers, for example, will produce drunkenness or taper in screw threads cut on the centers; off-angle centers will erratically deflect the work piece mounted on the centers; and poor finish of the center support surfaces will cause the work piece to chatter with attendant tool breakage and poor surface finishes on the elements of the final product. Aside from the adverse effects on the final product produced from the work piece, such defects in the centers will often prematurely wear down the dead center on the lathe.

The principal object of the present invention, therefore, is to produce precision support centers in machine elements which will permit the fabrication of precision parts.

In evaluating the shortcomings of prior art center forming techniques, it became apparent that much of the trouble results from drilling the opposed centers one-at-a-time, and thereafter finishing them one-at-a-time. Another inherent weakness of center grinding and honing machines is that the peripheral velocity of such cutting tools varies from zero feet per second at the tip to a maximum value at the large end of the tool or wheel cone base diameter—a fact that can not possibly provide uniform cutting action. Then too, even where cone-shaped or V-shaped steady rests are used to support the work piece at one end while the other is being ground, the fact that the surfaces contacting the rests are still only roughly machined means that true coaxial alignment is not possible.

The exemplary embodiment of the present invention employs a pair of coaxially aligned hammers having faces constituting mirror images of the centers to be formed in the work piece. With a work piece predrilled along a common axis and supported between the faces of the hammers, the hammers are rapidly oscillated to simultaneously peen the surfaces of the centers. The result is a work piece having opposed centers lying along a common axis whose precision surfaces are mirror images of the highly finished hammer faces. Since impact deformation is used rather than cutting or grinding, the face angles are uniform and the surface finish is as good as the faces of the peening hammers. Moreover, means are provided to control the depth of penetration of either or both of the peening hammers so that support centers, which are in every sense of the word identical, are formed.

The exemplary apparatus employed to form such sophisticated or precision centers on a work piece includes the combination of a frame member, a pair of spaced-apart center forming hammers supported on the frame member and in turn supporting a work piece therebetween, means for effectively imparting oscillatory motion to the hammers along the common axis to simultaneously peen the center surfaces, and selected means to control the depth of penetration of the individual hammers.

The process disclosed for producing accurate and highly sophisticated centers in work pieces generally comprises the steps of forming generally conical-shaped apertures in opposite ends of a work piece along a common axis, peening the surfaces defining the conical-shaped apertures simultaneously using conically-shaped peening hammers supported along a common axis coincident with the longitudinal axis of the work piece, while individually controlling the depth of penetration of the peening hammers into said work piece, and rotating the work piece occasionally about the common axis as the centers are being produced.

These and other objects, advantages and features of the present invention may be more fully understood when the following detailed description is read with reference to the drawing in which:

FIG. 1 is a schematic representation of a prior art center grinding or honing tool;

FIG. 2 is a schematic representation of a prior art technique of grinding or honing a support center of a work piece;

FIG. 3 is an exemplary embodiment of apparatus constructed in accordance with the present invention;

FIGS. 4a, 4b, and 4c are schematic representations of alternative ways of imparting oscillatory motions to the peening hammers of the exemplary apparatus of FIG. 3; and FIG. 5 is a schematic diagram of the peening hammers and work piece designed to illustrate the action forces and their equal and opposite reaction forces.

As has been discussed previously, one of the difficulties with center grinding, honing or lapping techniques for finishing a support center is that the peripheral speeds vary from 0 f.p.s. at the tip to a maximum at the large end or base of the tool or wheel cone. FIG. 1 illustrates a conventional, conically shaped grinding tool. When the tool is rotated at constant speed $\omega$, the velocity of the tool at point A is maximum, at point C zero, and at point B in between zero and the maximum. Thus, the cutting action of the tool is most pronounced at point A and virtually non-existent at point C. This lack of peripheral speed causes a grinding wheel or tool to break down as longitudinal pressure is applied, resulting in deflection of the work piece. The result is that the surface of the work piece center is not symmetrical nor does it have a highly uniform finish.

FIG. 2 illustrates a prior art technique for supporting a work piece while one of the work piece centers is finished. The work piece 21 is supported in the jaws of a vise 22 or with one end on a cone-shaped center rest 23 (or both) and on a stationary rest 24 while a honing stone 25 is brought to bear against the surface of the other center support aperture. While this supports the work piece along more or less coaxial centers, the rough semi-finished surfaces of the part resting in cone-shaped rest 23 and in the steady rest 24 prevents true coaxial alignment of the rests and the wheel or tool axes. This, along with the previous imperfections of honing stones and grinding tools, combine to limit the excellence of the finished support centers. Of course, the techniques schematically illustrated do substantially improve the finish of drilled support centers but they usually fall short of the sophisticated centers possible by the use of the present invention. Since each center must be machined separately, conventional methods are not only slow but require a high order of craftsmanship as well.

The exemplary apparatus depicted in FIG. 3 is designed to provide the precision centers demanded for precision machine elements. The apparatus includes a generally C-shaped frame member 31 having a base part 32 at its lower end and a threaded aperture 33 at its upper end. A lower stationary peening hammer 34 is affixed to the upper surface of the base 32 of the frame member, while a movable peening or center support assembly 36 threadedly cooperates with the upper end thereof.

The assembly 36 includes a threaded body member 37 which engages threaded aperture 33. It has a handle 38 connected at its upper end by which its vertical position—with respect to the fixed or stationary hammer 34—may be changed.

The body member 37 includes an air hammer, indicated generally by 41, which receives air from a source (not shown) by way of air hose 42. The air hammer, per se, forms no part of the present invention. For example, it could be a Cleco No. 16 AJ type, manufactured by the Cleco Air Tools Division of the Reed Roller Bit Company, which operates at a speed of 5600 cycles per minute. Its function is to provide the oscillatory motion for the movable peening hammer 43 which is a part of assembly 36.

In this connection, FIGS. 4a, 4b, and 4c represent alternative ways in which the impact can be imparted to the hammer 43.

FIG. 4a schematically illustrates the hammer 43 biased by a coil spring 46 and driven by a rotating cam 47. As the cam rotates, each camming surface 48 moves the hammer 43 downward and the intermediate flats permit spring 46 to move it upwards toward its equilibrium position (as illustrated). The result is a downward oscillatory motion imparted to the hammer 43.

FIG. 4b illustrates the hammer 43 driven by a rotary actuated plunger type cam 49. As the device 49 rotates, the hammers 51 successively strike the edge of the convex head 52 of the center peening hammer 43 and cam the head driving hammer 43 downwardly as they do. The result is a downward oscillatory motion for hammer 43.

FIG. 4c illustrates a drive for the hammer 43 including a coil 56 and a slug 57. Each time the coil 56 is energized (by means not shown) the slug strikes the top of the hammer 43 and drives it into the work piece. If the coil is rapidly cycled, then the hammer 43 is subjected to a series of longitudinal impacts. It should be apparent that other means can be used to impart the required high frequency oscillation to the upper peening hammer 43.

Returning to the apparatus of FIG. 3, the upper hammer assembly 36 has the peening hammer 43 affixed to a flat plate 61 which abuts shoulder 62 on the lower end of the air hammer 41 (to which coil spring 46 is affixed). Both hammers 34 and 43 have annular grooves 63 formed in their sides.

Cooperating with the hammers are spacer collars 66 which are apertured to telescope over the ends of the hammers 34 and 43 and rest against the base 32 and plate 61, respectively. They are held in place by opposite disposed set screws 67 which thread radially through the collars 66 to ride in the grooves 63. As can be observed, the height $h$ of the collars 66 are equal, but if it is desirable that the hammer penetrate one or both ends of a work piece 10 to different depths, then collars, such as those shown dotted as 71 or 72, could be provided. These have depths of $h'$ and $h''$, respectively. Different depth collars could also be provided for the stationary hammer 34.

It will be observed that the hammers 34 and 43 have faces formed as right circular cones with a 60° included angle. They are preferably constructed from a hardened tool steel or tungsten carbide and are very accurately ground to a high order of roundness, shape and surface finish.

The hammers 34 and 43 lie along the common longitudinal axis 75 of the exemplary work piece 10 and means including a motor 76 and a flat belt 77 (preferably of cloth) is provided to slowly rotate the work piece 10 as the apparatus is operated to form support centers. Such slow rotation, constant or intermittent, will improve the surface finish of the work piece by minimizing the effect of any imperfections in the hammer's faces on the support centers.

Another means of moving the hammers longitudinally so that a work piece can be inserted between them is to make the fixed hammer 34 slidable along longitudinal axis 75. Once the hammers 34 and 43 engage the ends of the work piece 10, the slidable hammer 34 would be held by a split lock that grasps the shank of hammer 34.

While the exemplary apparatus illustrated in FIG. 3 uses a stationary center support and hammer 34, which cooperates with the movable one 43, both hammers could be oscillated. The effect would be unchanged, however. It is one of Newton's basic laws that for every action there is a reaction. So, each time the center support 43 is struck by the air hammer 41, it applies force by way of the surfaces of the hammer face 43 to the upper aperture of the work piece 10. This generates a force pattern of equal magnitude but opposite sense along the face of the stationary support hammer 34.

This can best be understood by looking to FIG. 5 wherein the impact forces of hammer 43 are illustrates at diameters $a_1$, $a_2$, and $a_3$ as $A_1$, $A_2$ and $A_3$, respectively. These action forces generate reaction forces $B_1$, $B_2$ and $B_3$ which with them lie in planes parallel to the longitudinal axis 75 and $A_1 = B_1$, $A_2 = B_2$ and $A_3 = B_3$.
$\rightarrow \leftarrow \rightarrow \leftarrow \rightarrow \leftarrow$ The operation of the apparatus of FIG. 3 is as follows: The centers of an exemplary work piece 10 will have been pre-drilled with a bit having a base angle a few degrees less than the base angle of the faces on the hammers 34 and 43. If 60° conical faces are used on the hammers, then the drill angle is preferably 55° to 58°. The upper assembly 36 is rotated upwardly to permit the work piece 10 to be positioned between the center support hammers 34 and 43, and then assembly 36 is lowered to the position shown with the hammers bearing against surfaces defining the apertures in the end of the work piece 10.

Once the work piece 10 is in place, the air hammer 41 is operated and the oscillatory movement of the face of hammer 43 causes it to strike the predrilled cavity in the upper end of work piece 10. These action forces and their reaction counterparts on the cavity in the lower end of work piece 10, imparted by the face of hammer 34, peen the support centers to form highly sophisticated centers. As previously noted, the depth of penetration of the hammer faces is controlled by the selection of collars 66.

During peening operation, motor 76 is energized (by means not shown) to rotate the work piece 10 slowly by way of belt 77.

While the present invention has been described with respect to an exemplary embodiment, it should be apparent to those skilled in the art that a number of modifications could be made without departing from the spirit and scope of the present invention. For example, it may be desirable to use hammers having internal finished surfaces to peen the external surfaces of a work piece as might be needed to support a gyroscope. Also, it may be helpful to surface finish a plurality of surfaces, whether internal or external ones simultaneously so that each pair retains its coaxial alignment and transverse spacings. This latter might be particularly desirable where the axles for a precision gear train is being constructed and center-to-center distances are critical. For the foregoing reasons, the invention should only be limited to the extent of the appended claims.

What is claimed is:

1. Apparatus for producing precision coaxial center holes in a work piece comprising, in combination,
   a frame having a longitudinal axis,
   a first center support having a conical face affixed to said frame along said longitudinal axis,
   a second center support having a conical face supported on said frame for movement along said longitudinal axis,
   means operable to move said second support toward said first support whereby a work piece having coaxial center holes is supported between said center supports, and
   means operable to impart oscillatory motion along said longitudinal axis to said second center support whereby said center holes are substantially simultaneously shaped.

2. Apparatus for producing precision coaxial center holes in a work piece in accordance with claim 1 and including
   means to control the depth of penetration of each of said center supports into its respective end of said work piece.

3. Apparatus for producing precision coaxial center holes in a work piece in accordance with claim 2 wherein said oscillatory means is an air hammer and said penetration control means includes individual collars of preselected thickness telescoped over each of said center supports.

4. Apparatus for forming coaxial precision surfaces in and on a machine element comprising, in combination,
   a frame member,
   a pair of peening hammers supported on said frame member in spaced apart relation and along a common axis,
   said hammers being adapted to support a machine element between them,
   means for imparting oscillatory motion along said common axis to at least one of said peening hammers when they support a machine member therebetween whereby the support surfaces of the machine element are substantially simultaneously subjected to repetitive impacts by said hammers.

5. Apparatus for forming coaxial precision centers in machine elements in accordance with claim 4 and including means operable at times to rotate said machine element about its common axis.

6. Apparatus for forming coaxial precision centers in machine elements in accordance with claim 4,
   wherein the heads of said hammers are right circular cones.

References Cited by the Examiner

UNITED STATES PATENTS

| | | | |
|---|---|---|---|
| 354,412 | 12/86 | Harrington | 29—555 |
| 400,931 | 4/89 | McCloud | 29—193 |
| 1,166,931 | 1/16 | Pinder | 78—98 |
| 1,205,175 | 11/16 | Dodds | 29—193 |
| 1,294,337 | 2/19 | Hawkins | 29—555 |
| 1,871,757 | 8/32 | Stevens | 78—42.3 |
| 1,953,842 | 4/34 | Wearne | 78—98 |
| 2,304,976 | 12/42 | Watter | 78—13.1 |
| 2,730,175 | 1/56 | Piperoux | 78—98 |
| 3,049,788 | 8/62 | Martin | 29—90 |
| 3,059,315 | 10/62 | Chambers | 29—90 |
| 3,076,254 | 2/63 | Ricci | 29—90 |

RICHARD H. EANES, JR., *Primary Examiner*.